United States Patent Office 3,221,191
Patented Nov. 30, 1965

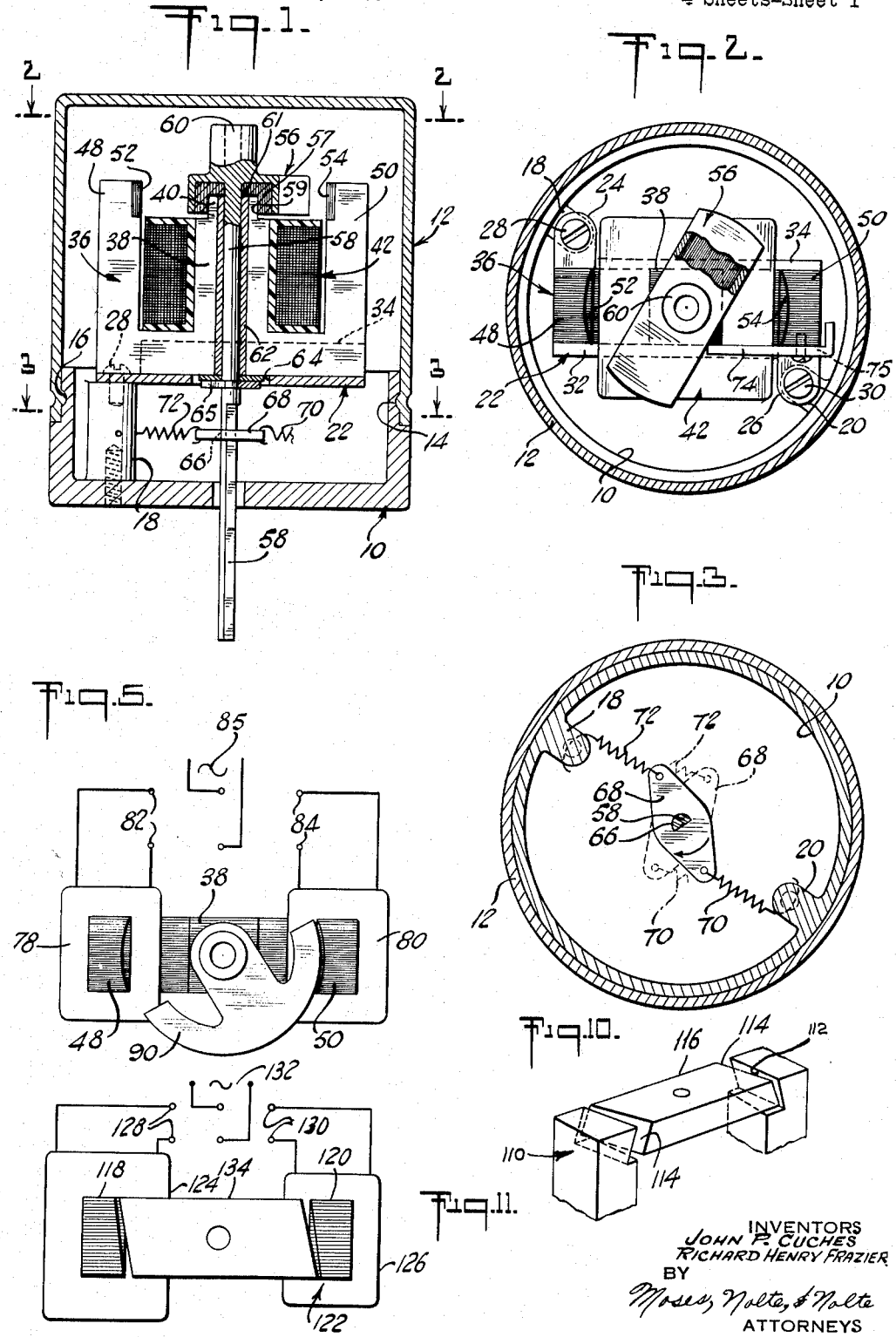

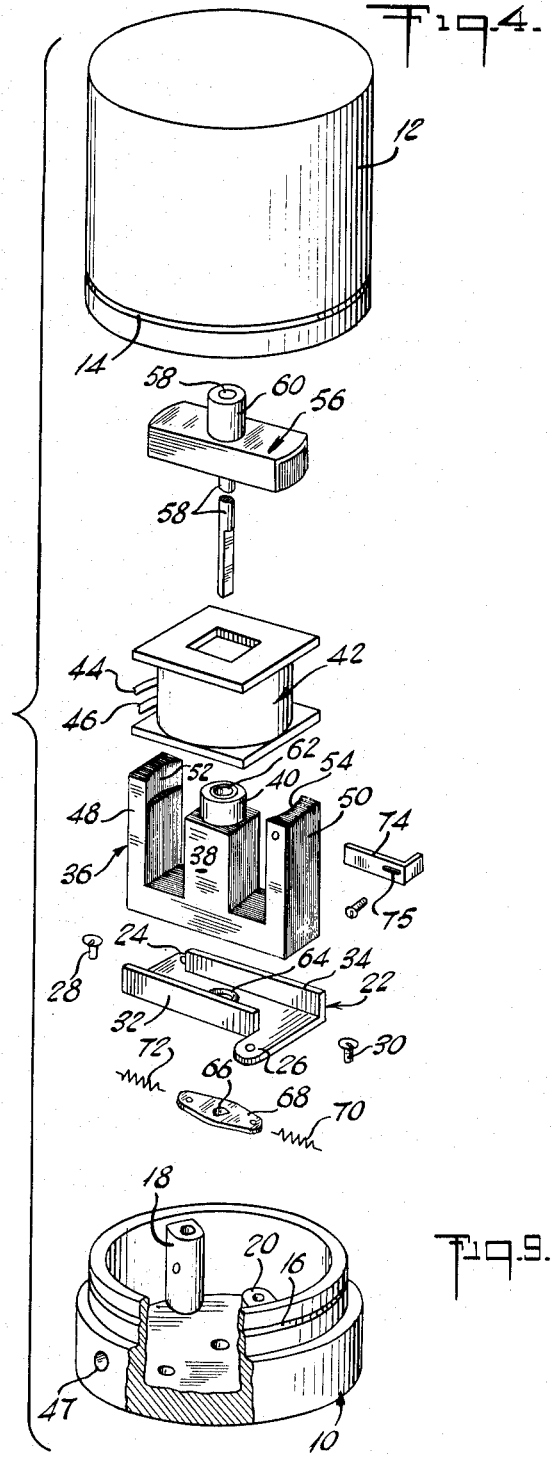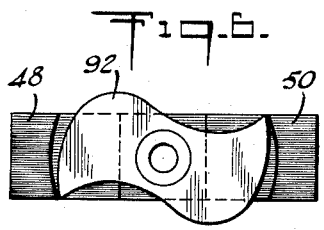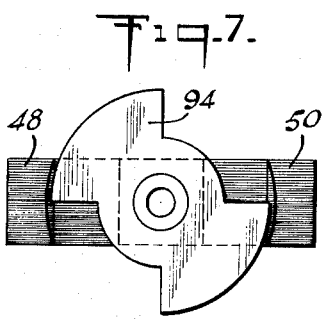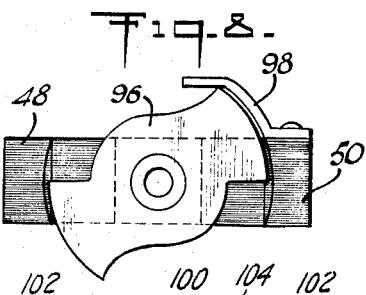

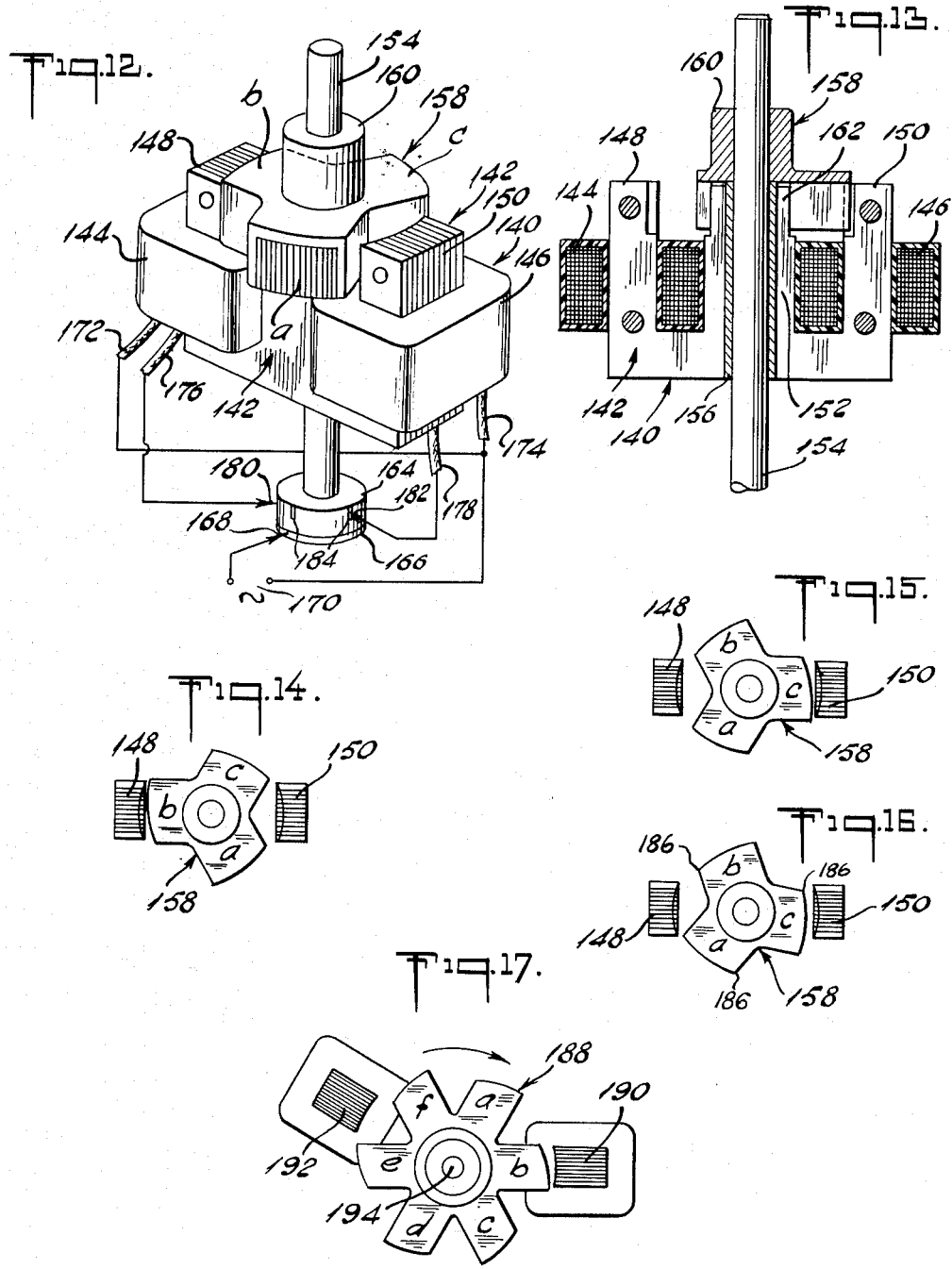

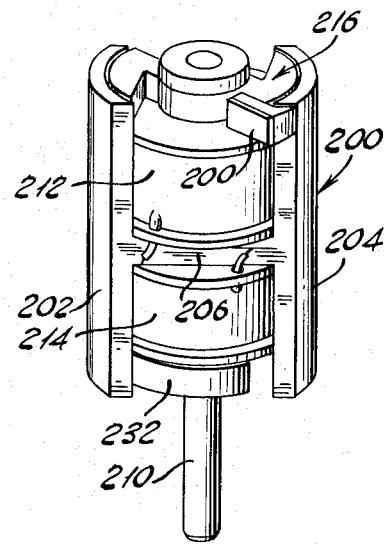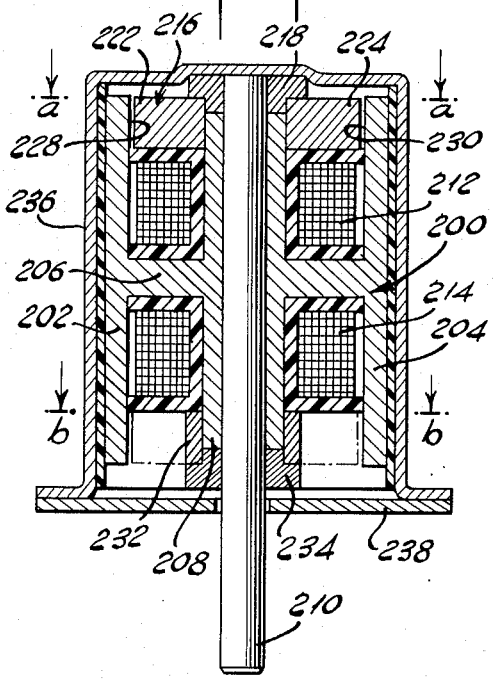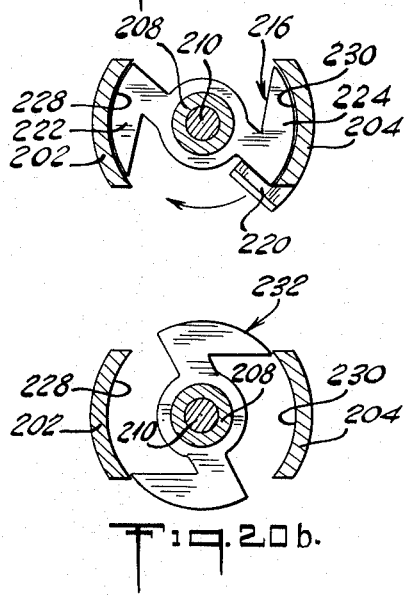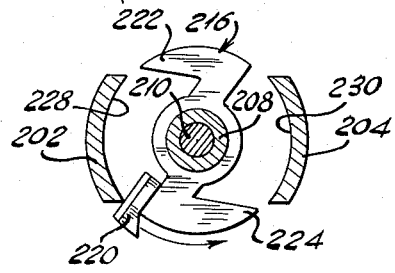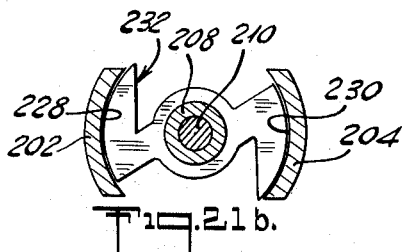

3,221,191
ANGULAR DISPLACEMENT SOLENOID
John P. Cuches, Middle Village, N.Y., and Richard Henry
Frazier, Winchester, Mass., assignors, by mesne assignments, to Daco Instrument Company, Inc., Brooklyn,
N.Y., a corporation of New York
Continuation of application Ser. No. 801,330, Mar. 23,
1959. This application Sept. 12, 1962, Ser. No. 225,955
16 Claims. (Cl. 310—36)

This application is a continuation of our application, Serial No. 801,330 (now abandoned), filed on March 23, 1959, and entitled "Angular Displacement Solenoid." The invention relates in general to solenoids and particularly to a new and useful angular displacement type solenoid or simplified magnetic structure, having improved torque characteristics, and capable of use for applications requiring a wide angular movement.

The invention provides a rotary-type solenoid which, with minor adjustments, may be given torque-angle characteristics over a wide angular turning range. The invention includes a novel armature rotor and stator construction in which the rotor is rotatably mounted on the central portion of an E-shaped stator. A feature of this construction is that the turning force or torque can be easily varied for numerous design requirements by a simple adjustment to a pole piece extension and stop or by changing the air-gap surface contours to provide variations in the relative position of these surfaces during stages of angular displacement. The solenoid is particularly applicable for alternating current and may operate therewith with a minimum of vibration, usual to devices of this kind.

In accordance with the invention both the rotor and stator are of either a laminated or solid magnetic construction, the stator being supplied with a coil activating-winding. The parts may be easily machined to give desired air-gap configurations and torque characteristics.

A feature of the invention is the easy adjustment of the angular turning range of the rotor by a novel stop mounted on one of the stator pole faces. This stop can be of magnetic material to provide a holding action at the terminus of the angular movement, or may be made of non-magnetic material if no holding action is required. Variations in its shape and location permit wide adjustments in the solenoid action.

A solenoid constructed in accordance with this invention can be made to rotate within various angular displacement ranges, by selecting, in the initial manufacture, rotor and stator air gap geometries in which the gap length and turning force may be easily determined for each point in the rotor turning cycle in accordance with design requirements, or, by changing the location or configuration of the pole face stop after the rotor and stator design has been fixed.

Another feature of the invention is the novel mounting of the rotor on a portion of the stator. This construction provides for improved efficiency of operation, with a minimum of magnetic flux leakage, and permits the wide range of use of the solenoid with the adjustments mentioned above.

Accordingly, it is an object of this invention to provide an improved rotary solenoid.

Another object of this invention is to provide a rotary solenoid easily adjustable for use over a wide angular turning range.

A further object of this invention is to provide a rotary solenoid which is rugged in design, simple in construction, and economical to manufacture.

The various features of novelty which characterize the invention are pointed out with particularity in the claims annexed to and forming a part of this specification. For a better understanding of the invention, its operating advantages and specific objects attained by its user, reference should be had to the accompanying drawings and descriptive matter in which there is illustrated and described a preferred embodiment of the invention.

In the drawings:

FIG. 1 is a transverse sectional view of an angular displacement solenoid constructed in accordance with the invention;

FIG. 2 is a horizontal section taken on a line 2—2 of FIG. 1;

FIG. 3 is a horizontal section taken on a line 3—3 of FIG. 1;

FIG. 4 is an exploded perspective view, with a portion shown in section, of the solenoid shown in FIG. 1;

FIG. 5 is a somewhat schematic top plan view showing an arrangement of rotor and stator for effecting both forward and reverse energized rotation;

FIGS. 6 to 8 inclusive are somewhat schematic top plan views of various rotor configurations;

FIG. 9 is a somewhat schematic top plan view of a straight rotor and stator pole face configuration;

FIG. 10 is a perspective view of a rotor and stator indicating pole face contour variation in three dimensions;

FIG. 11 is a somewhat schematic top plan view similar to FIG. 5 but indicating a straight rotor pole face construction and different size stator coil windings for each of the end poles;

FIG. 12 is a fragmentary perspective view of another embodiment of the invention;

FIG. 13 is a transverse section of the rotary solenoid indicated in FIG. 12;

FIG. 14 is a top plan of the solenoid indicated in FIG. 12, indicating the rotor in the initial stage of rotation and wherein the coils are alternately energized to produce a continuous controlled rotation of the rotor;

FIG. 15 is a view similar to FIG. 14 but indicating the rotor in an advanced position of rotation;

FIG. 16 is a view similar to FIG. 14 but indicating the rotor in a still further advanced position of rotation;

FIG. 17 is a top plan of still another embodiment of the invention;

FIG. 18 is a perspective view of still another embodiment of the invention;

FIG. 19 is a transverse section of the solenoid indicated in FIG. 18;

FIG. 20a is a horizontal section taken on the line a—a of FIG. 19 indicating the upper rotor in an energized position;

FIG. 20b is a fragmentary horizontal section taken on the line b—b of FIGURE 19 indicating the lower rotor in a non-energized position;

FIG. 21a is a horizontal section taken on the line a—a of FIG. 19 but indicating the upper rotor in a non-energized position;

FIG. 21b is a horizontal section taken on the line b—b of FIG. 19 but indicating the lower rotor in an energized position.

Referring to the drawings in particular the invention as embodied therein includes a lower mounting cup piece generally designated 10 which supports the working parts, and on top of which is secured an open-ended cylindrical cover 12. The cover 12 is provided with an internal projecting annular portion 14 which fits into an annular groove 16 on the cup piece 10.

The cup piece 10 is provided with two integrally formed diametrically opposite mounting columns 18 and 20 which support a rectangular channel piece generally designated 22. The channel piece 22 has offset flanges 24 and 26 at each end having apertures to receive securing bolts 28 and 30, respectively, which extend therethrough and are secured to the mounting columns 18 and 20, respectively. The channel piece 22 is provided with two upstanding side portions 32 and 34 between which is fitted a substantially E-shaped laminated stator generally designated 36.

The stator 36 is, in this embodiment, a lamination of magnetic plates and includes a substantially rectangularly cross-sectioned central-portion 38 which is cut away as by machining, milling or grinding at the upper end to form a cylindrical bearing and support piece 40. An electromagnetic exciting means such as a winding or coil piece generally designated 42 is positioned around the middle section 38. The coil piece 42 is provided with two wire terminals 44 and 46 which extend through openings 47 in the cup piece 10 to a suitable electrical power source (not shown). The stator 38 also includes end poles 48 and 50 which extend upwardly to substantially the same height as the bearing and support 40. The opposite faces of the outer pole pieces 48 and 50 are cut away as at 52 and 54 to define the desired pole face outline and to accommodate the rotor.

In accordance with the invention, a rotor generally designated 56 and made of laminated magnetic plates, is connected to a depending shaft 58. In this instance, the rotor is made of laminated magnetic plates 57. However, a solid material construction may be used. It is preferable to make the rotor structure laminated for A.C. operation or for high speed D.C. operation. The rotor plates 57 are provided with an annular opening 59 and the plates are held together, and the opening 59 is covered by a channel-shaped hub member 60 made of non-magnetic material. The hub member 60 is affixed to the shaft 58 and is rotatably supported upon a washer 61 which rests on a bushing sleeve 62 which extends slightly above the top of the bearing and support piece 40 of the stator. The shaft 58 extends slightly above the top of the bearing and support piece 40 of the stator. The shaft 58 extends into the bushing sleeve 62. The construction is such that no magnetic material is presented above the piece 40 of the stator which would retard the movement of the rotor.

The shaft 58 extends through an opening 64 in the channel piece 22 and is secured therein by a retaining C-clamp 65 which is fitted over a reduced portion of the shaft. The shaft 58 is fitted through spline-contoured openings 66 of a retaining piece 68. The retaining piece 68 is supported above the bottom of the cup piece 10 by tensioning elements or resilient means such as a pair of tension springs 70 and 72 connected to each end of the retaining piece and to a respective mounting column 18 and 20. The retaining piece 68 is fixed, in respect to angular movement, to the shaft 58. The tension springs 70 and 72 bias the shaft 58 with the rotor 56 against a combination holding and angular movement limit-stop 74, fastened to the upper end of the pole piece 50. In this instance, the stop 74 is L-shaped and is provided with an adjustment slot 75 to receive a bolt for adjustable mounting on the pole piece 50. The stop 74 is designed to limit the movement of the rotor in each direction. The springs 70 and 72 move the rotor 56 to the de-energized position indicated in FIG. 2, at which point the end of the stop contacts a side face of the rotor. When the coil 42 is energized, the rotor 56 will rotate to a position in alignment with the pole faces 52 and 54 and with one side parallel to, and abutting the stop 74. The energized position of the retaining piece 68 is indicated in dotted outline in FIG. 3, while the de-energized position is indicated in solid lines in the same figure.

In the embodiment shown in FIG. 5, the end pole pieces 48 and 50 are provided with two separate coil windings 78 and 80. The coil windings 78 and 80 are alternately connected at their terminals 82 and 84, respectively, to a suitable source of alternating current supply 85. A suitable means such as switch relay (not shown) is provided for alternately connecting these terminals to the current supply to energize either the coil 78 or the coil 80. In this instance, a rotor 90, having the semi-annular pole face configuration indicated in FIG. 5, is mounted on the middle section 38 as before, but is contoured so that there will be sufficient portions thereof in proximity to each pole face to be pulled in the direction of the energized pole 48 or 50 when the pole is energized. This rotary solenoid design permits controlled angular movement in both directions by the alternate energizing of the pole pieces 48 and 50.

Many variations of rotor and stator designs may be incorporated in the basic invention arrangement in order to achieve desired angular turning conditions and turning forces. FIGS. 6, 7 and 8 indicate variations in stator and rotor pole face geometry to achieve different effective torques for each variation in angular displacement. Rotor pole face contours indicated at 92, 94 and 96 may be used advantageously for large angular movements. With such shapes, portions of the rotor pole face lie adjacent the stator faces during the wide angular movement. Thus, when the stator is energized, pole face portions will be within easy magnetic pulling range.

The feature of the solenoid construction is that the stator and rotor can be fabricated with many variations in their geometric pole face shapes and air gap configurations. The torque as a function of angular position (torque-angle characteristic) can be tailored to meet specifications by shaping of the air gap surfaces and by adjustment of the relative position and extent of these surfaces with respect to the beginning and end points of the rotor stroke. A further feature of this rotor and stator construction is that the rotor stroke can be carried directly to 90° or somewhat beyond without the use of mechanical linkages, gearing or other auxiliary mechanisms.

The configuration of the rotor 92 illustrated in FIG. 6 together with the matching faces of the stator 48 provides a solenoid having gap length variation, gap arc and stroke, beginning and end points, all chosen in accordance with the angular displacement and turning torque characteristics desired. The spiral development of the rotor pole faces provide for gap length change with rotor angle in accordance with a fixed law. One interesting feature of the configuration is that the stator pole face axial dimension is independent of the actual radius of the armature. The steepness of the spiral with respect to angle always must be the same, but the steepness with respect to arc length increases as the armature is made smaller. Effective air gap area also changes inevitably owing to fringing flux. Area can be changed deliberately by changing air gap height (axially) through variations of axial pole face dimensions of rotor or stator or both. Another way of accomplishing this is to cut back a few armature laminations in steps, on the trailing side, so that the rate of change of reluctance is increased at the end of the stroke.

The configuration of the face of the rotor 94 of FIG. 7 may be a circular arc concentric with the shaft or may be a circular arc approximating the spiral, eccentric with respect to the shaft. The larger the armature radius compared with the pole face axial dimension, the more readily is the spiral approximated by a circular arc, and the pole face part of it by a straight line.

The configuration of the face of the rotor 96 of FIG. 8 may have a spiral contour, a circular contour concentric with respect to the shaft, or a circular contour eccentric with respect to the shaft.

The pole piece 50 may be provided with an extension-stop 98 made of a magnetic material and arcuately contoured in a direction outwardly from the pole face to permit greater angular movement of the rotor beyond the edge of the pole piece (FIG. 8). In this connection, it should be appreciated that where the stop 74 or the extension-stop 98 is made of non-magnetic material, there will be no holding action in the energized position. However, where the stop is made of a magnetic material, there will be a holding action of the rotor against the stop in the energized position.

Besides the curved configuration shown in FIGS. 6 to 8, the rotor and stator may be made with substantially straight pole faces. Rotor 100 indicated in FIG. 9 is provided with pole faces 102, 102 which are formed at an acute angle to the rotor sides 104, 104. Pole faces 106, 106 on the stator generally designated 108 are shaped to complement the pole faces 102, 102 but are not parallel thereto, being offset at a slight angle to prevent wedging of the rotor against the pole faces.

In FIG. 10, a stator generally indicated 110, is provided with pole faces 112, 112 which are contoured in three dimensions for operative association with similarly contoured pole faces 114, 114 of a rotor 116.

An alternate to the embodiment shown in FIG. 5 is indicated in FIG. 11. Pole faces 118 and 120 of a stator generally designated 122 are provided with two separate coil windings, a large one having a great many coil windings 124, and a small one 126, of lesser coil windings. The coil windings 124 and 126 are alternately connected at their terminals 128 and 130, respectively, to a suitable source of alternating current supply 132. Suitable electrical control apparatus is connected to the current supply 132 to energize alternately the terminals 130 or 128 in order to effect many variations in the controlled turning of a rotor 134. With such an arrangement fine control turning characteristics responsive to various electrical energy impulses may be obtained by alternately energizing the large coil 124 or the small coil 126. In the embodiment of FIG. 11, the rotor 134 is provided with substantially straight or coplanar end pole faces.

Thus, it can be seen that the invention provides a novel rotary solenoid having a simple magnetic structure and which can be readily adapted to an infinite variety of angular displacement requirements. The torque can be increased or decreased at rotor angular displacement increments by rotor and stator contour configurations, and the angular displacement range can be changed by variations in these configurations as well as in the stop mechanism. A solenoid constructed in accordance with this invention can be used effectively with either A.C. or D.C. electrical power supply and when used with A.C., the pulsating action normally caused by the variation and change in direction of the current will not be objectionable. A solenoid constructed in accordance with this invention will utilize much less power than similar known devices of this character.

Referring to FIGS. 12 to 16 there is indicated another embodiment of rotary actuator generally designated 140. The actuator 140 comprises a substantially E-shaped stator generally designated 142 having excitation coils 144 and 146 positioned over outside pole pieces 148 and 150, respectively. A central pole piece 152 is hollowed to receive a shaft 154 which is rotatably positioned inside a bushing 156 which fits in the hollowed portion of the central pole piece 152.

A rotor generally designated 158 comprises an outer substantially Y-shaped cover member 160 which is rotatably supported on the upper end of the bushing 156 at a location slightly above the top edge of the central pole piece 152. As in the previous embodiment, the pole piece 152 is rounded to present a bearing support 162 which fits into a hollow cylindrical recess cut in the underface of the rotor 158. The rotor 158 is fashioned with three radially extending magnetic portions a, b, and c presenting rotor pole faces having center lines approximately 120° apart.

The actuator 140 may be operated as a solenoid wherein the range of movement may be controlled for a large or small rotary angle of operation by a suitable stop and spring mechanism, or the device may be operated with return action electrically controlled and without any spring return. In the present embodiment the device is arranged to produce a predetermined angular displacement or a continuous rotary motion depending on impulses received from any remote control source. For this purpose the device is provided with a switch ring 164 having a conductive segment 166 which is connected by a brush 168 to a source of electrical power 170. The other terminal of the electrical power source 170 is connected to one terminal 172 of the coil 144 and one terminal 174 of the coil 146. The other terminals 176 and 178 of the coils 144 and 146, respectively, are connected to brush means 180 and 182, respectively, which are biased into contact with conductive segments 184 defined on the switch ring 164. Energy supplied to the ring 164 is communicated internally to the segments 184 in order to energize intermittently one or the other of the coils 144 and 146 in definite timed sequence depending on the relative positions of the rotor and stator.

In FIGS. 14 to 16 the rotor 158 is indicated in the various angular positions assumed during energization of either of the coils 144 and 146. In the position indicated in FIG. 14 coil 146 is energized from the ring switch 164 to attract rotor portion c. The other coil 144 at this instant is not energized. Energization of the coil 146 effects pulling in of the portion c into alignment with the pole piece 150. FIG. 15 indicates the rotor portion c in alignment with the pole piece 150 at which position the switching system de-energized coil 146. At a position slightly in advance of this the rotor portion a is attracted by energization of the coil 144 as indicated in FIG. 16. It should be noted that the trailing edges 186 of each of the rotor portions a, b, and c are cut back in order to minimize the magnetic flux on this side and lessen the possibility of reversal of the rotary motion of the actuator.

In FIG. 17 there is illustrated another embodiment of the invention including a rotor generally designated 188 and having six rotor pole face portions a, b, c, d, e, and f. In this embodiment pole piece portions 190 and 192 and a central bearing pole piece 194 are provided in a substantially E-shaped stator construction. The pole piece 192 is offset from a position directly opposite the pole piece 190. This construction, similarly to the previous embodiment, may be constructed to achieve continuous rotary motion or intermittent angular displacement with either electromagnetic actuation in both directions or in one direction with a spring return.

In FIGS. 18 to 21, inclusive, there is illustrated a modified back to back E-stator construction of a rotary actuator generally designated 200. The rotary actuator 200 includes curved opposite wall portions 202 and 204 of the stator joined by a central dividing portion 206. The stator is provided with a central rotor bearing portion and pole piece 208 which extends outwardly from each side of the partition piece 206. The portion 208 is hollowed to receive a central shaft 210.

An actuating coil 212 is positioned on the upper end of the bearing and pole piece 208 and a similar actuating coil 214 is positioned on the lower end of the central rotor bearing and pole piece 208. A substantially Z-shaped rotor 216 is affixed to the shaft 210, it being supported by a bearing bushing 218 which is affixed to the upper end of the shaft. The rotor is provided with an outwardly extending stop 220 and has pole faces 222 and 224 which cooperate with the curved inner pole faces 228 and 230 of the stator pole pieces 202 and 204, respectively.

Also affixed to the shaft 210 for rotation therewith is a return actuating rotor generally designated 232 and which is secured on a bushing 234 affixed to the shaft 210. The complete construction is positioned within a hollow cylindrical cover member 236 which is closed by an end plate 238.

The actuator illustrated in FIGS. 18 to 21 may be rotated under electromagnetic control in either direction in the embodiment illustrated. The device is actuated by exciting the coil 212 to attract the rotor 216 to the position indicated in FIG. 20a. The rotor 232 is affixed to the shaft at approximately 90° angular displacement from the rotor so that it assumes the position indicated in FIG. 20b. Return to the original position is effected by actuating the coil 214 to attract the rotor 232 into alignment with the pole faces 224 and 226. The stop 220 limits movement of the rotor in each direction when it strikes the edge of the pole pieces 202 and 204.

While specific embodiments of the invention have been shown and described in detail to illustrate the application of the invention principles, it will be understood that the invention may be embodied otherwise without departing from such principles.

We claim:

1. A rotary electromagnetic actuator comprising a stator having at least two elongated pole pieces arranged in spaced locations, a rotor rotatably mounted around the free end of one of said pole pieces, said one pole piece extending into and being perpendicular to said rotor, said rotor having an outer face arranged to rotate past the inside face of the other of said pole pieces, said stator including electromagnetic means to energize said pole pieces to rotate said rotor in one direction, and means cooperating with said rotor for rotating the rotor in the opposite direction when said electromagnetic means is not effective, and adjustable stop means secured to the other of said pole pieces and extending into the path of rotation of the rotor at the stop position, said stop means being made of magnetic material whereby to hold rotor in the energized position.

2. An actuator according to claim 1 wherein said stop means includes a curved portion extending outwardly from said inside face to present an electromagnetic force acting on said rotor at a spaced location from said inside face.

3. A rotary electromagnetic actuator comprising a substantially E-shaped stator, a rotor rotatably mounted around the free end of the central leg of said stator, said central leg extending into and being perpendicular to said rotor and including a bearing portion extending into and supporting said rotor, said rotor having outer faces arranged to rotate past the inside faces of the end legs of said stator, said stator including electromagnetic means to magnetize said central and end legs whereby to rotate said rotor in one direction, means cooperating with said rotor for rotating said rotor in the opposite direction when said electromagnetic means is not effective and an adjustable stop intermediate said rotor and said stator and extending into the rotation path of said rotor, said stop including a curved portion extending outwardly from an end leg to present electromagnetic force acting on said rotor at a spaced location from said inside faces.

4. A rotary actuator comprising a substantially E-shaped stator made of a lamination of magnetic material and having the upper portions of opposite faces of the outside legs formed in curved outline and the central leg cut away to define a cylindrical rotor mounting, the central portion of the central leg being hollowed, a rotor, including a rotor portion and a downwardly depending shaft portion arranged in the hollowed portion of said stator central leg and an annular recess formed in the underface of the rotor portion thereof in which is rotatably positioned the cylindrical rotor mounting of the central stator leg, said stator including electromagnetic means to energize one of said legs whereby to rotate said rotor in one direction, and means co-operating with said rotor for rotating said rotor in the opposite direction when said electromagnetic means is not effective, wherein the outer ends of the rotor and the inside faces of the outside legs of the stator are of a spiral contour in plan.

5. An actuator according to claim 4 wherein said means for rotating said rotor in the opposite direction is a spring which is biased by rotation of the rotor when said electromagnetic means is effective to rotate said rotor.

6. A rotary actuator comprising a substantially E-shaped stator made of a lamination of magnetic material and having the upper portions of opposite faces of the outside legs formed in curved outline and the central leg cut away to define a cylindrical rotor mounting, the central portion of the central leg being hollowed, a rotor, including a rotor portion and a downwardly depending shaft portion arranged in the hollowed portion of said stator central leg and an annular recess formed in the underface of the rotor portion thereof in which is rotatably positioned the cylindrical rotor mounting of the central stator leg, said stator including electromagnetic means to energize one of said legs whereby to rotate said rotor in one direction, and means cooperating with said rotor for rotating said rotor in the opposite direction when said electromagnetic means is not effective, said rotor being shaped to present an end in abutting relationship to an inside face of an outside leg of said stator for over 170° of rotation, and said electromagnetic means being connected to energize each of the outside legs of said stator independently.

7. A rotary actuator comprising a substantially E-shaped stator made of a lamination of magnetic material and having the upper portions of opposite faces of the outside legs formed in curved outline and the central leg cut away to define a cylindrical rotor mounting, the central portion of the central leg being hollowed, a rotor, including a rotor portion and a downwardly depending shaft portion arranged in the hollowed portion of said stator central leg and an annular recess formed in the underface of the rotor portion thereof in which is rotatably positioned the cylindrical rotor mounting of the central stator leg, said stator including electromagnetic means to energize one of said legs whereby to rotate said rotor in one direction, means cooperating with said rotor for rotating said rotor in the opposite direction when said electromagnetic means is not effective, said rotor including a plurality of laminated plates and said annular recess being an opening extending through said plates, and a channel-shaped member extending over said plates and covering said opening and forming a bottom bearing supporting surface above said plates.

8. A rotary electromagnetic actuator comprising a stator including two spaced curved pole pieces, a central stator pole piece positioned intermediate said curved pole pieces, said central stator pole piece being hollowed at the central portion thereof, a shaft rotatably mounted in said central pole piece, first electromagnetic means within said stator to actuate one end of said central pole piece and said curved pole pieces, second electromagnetic means within said stator to actuate the other end of said central pole piece and said spaced pole pieces, a first rotor secured to said shaft for rotation therewith and surrounding one end of said central pole piece, a second rotor connected to said shaft and surrounding the opposite end of said central pole piece, said central pole piece extending into and being perpendicular to said rotors, said first and second rotors being substantially Z-shaped and include outer curved pole faces which cooperate with similar pole faces of said curved pole pieces and means coupled to both of said electromagnetic means to actuate each of said first and second electromagnetic means independently.

9. A rotary electromagnetic actuator according to claim 8, including a stop connected to said first rotor and extending laterally outwardly therefrom whereby to limit rotation of said first rotor by contact of said stop with portions of said curved pole pieces.

10. A rotary electromagnetic device capable of permitting rotation of its output shaft over either a small angular displacement or a large angular displacement range, comprising a stator having a central and two end elongated pole pieces, the central one of which is shaped to define a substantially cylindrical rotor mounting, a rotor including a combination cover and bearing supporting portion and a central magnetic laminated portion, said rotor having exterior faces, said laminated portion having a central opening therein extending through the center of said rotor and arranged to encircle the cylindrical portion of said stator, said combination cover and bearing supporting portion resting on the top of said cylindrical portion of said stator whereby to provide a constant and low reluctance path between said central stator pole piece and said rotor, said stator end pole pieces having faces complementary to the exterior faces of said rotor and shaped to produce predetermined torque and angular displacement characteristics upon actuation of said device, and electrical means within said stator to actuate said device.

11. An electromagnetic device according to claim 10, wherein said central stator pole piece is provided with a central bore, and including a bushing fitted into the central bore of said central stator pole piece and extending slightly above the top edge thereof to define a bearing support for said rotor.

12. A rotary electromagnetic device according to claim 11, including a thrust washer positioned between said bushing and said cover and bearing supporting portion of said rotor.

13. An electromagnetic device according to claim 12, including a bottom case, means for mounting said stator within said case and above the bottom thereof, and a cover member threaded onto said case and completely covering said rotor and stator.

14. A rotary electromagnetic device according to claim 13, wherein said rotor is provided with a bearing shaft which extends through said central stator pole piece and through an opening in the bottom of said case.

15. A rotary electromagnetic device according to claim 10, including a stop member positioned in the path of said rotor, said stop being adjustable to control the non-actuated position of said rotor, and means co-operating with said rotor to bias said rotor against said stop.

16. A rotary electromagnetic device according to claim 15, wherein said stop member is of magnetic material and includes a portion arranged in the magnetic path of movement of said rotor, the position thereof being adjustable to control the air gap geometry of said rotor and its torque characteristics over a range of angular displacement positions.

References Cited by the Examiner

UNITED STATES PATENTS

| | | | |
|---|---|---|---|
| 351,388 | 10/1886 | Mather | 317—197 X |
| 928,516 | 7/1909 | Hellmund | 310—36 |
| 1,764,658 | 6/1930 | Stoeklin. | |
| 2,216,620 | 10/1940 | List | 317—197 |
| 2,353,756 | 7/1944 | Price. | |
| 2,432,600 | 12/1947 | Werner et al. | 310—49 |
| 2,449,178 | 9/1948 | Sansbury | 310—49 X |
| 2,460,921 | 2/1949 | Candy. | |
| 2,499,632 | 3/1950 | Coake. | |
| 2,671,863 | 3/1954 | Matthews | 310—36 |
| 2,699,829 | 1/1955 | Burnette | 310—39 X |
| 2,721,904 | 10/1955 | Souter | 310—49 X |
| 2,794,134 | 5/1957 | Chevallereau | 310—39 |
| 2,814,743 | 11/1957 | Johnson | 310—36 |
| 2,825,826 | 3/1958 | Sundt | 310—37 |
| 2,866,870 | 12/1958 | Smiley | 317—197 X |
| 2,869,048 | 1/1959 | Reed | 317—197 X |
| 2,872,627 | 2/1959 | Buchtenkirch | 317—197 |
| 2,873,412 | 2/1959 | Pratt | 317—189 X |
| 2,950,088 | 8/1960 | Scott | 310—39 |
| 2,968,755 | 1/1961 | Baermann | 318—254 |
| 3,042,818 | 7/1962 | Busch | 310—49 |
| 3,092,740 | 6/1963 | Leland | 310—39 X |

FOREIGN PATENTS

| | | |
|---|---|---|
| 560,086 | 7/1958 | Canada. |
| 513,125 | 10/1939 | Great Britain. |
| 604,840 | 7/1948 | Great Britain. |
| 830,225 | 2/1952 | Germany. |
| 891,879 | 10/1953 | Germany. |
| 48,831 | 7/1940 | Netherlands. |
| 272,684 | 4/1951 | Switzerland. |
| 316,537 | 11/1956 | Switzerland. |

ORIS L. RADER, *Primary Examiner.*

JOHN P. WILDMAN, JOHN F. COUCH, *Examiners.*